Oct. 31, 1961     J. B. STORY     3,006,980

PRINTED BATTERY

Filed Aug. 21, 1959

United States Patent Office 3,006,980
Patented Oct. 31, 1961

3,006,980
PRINTED BATTERY
Joseph B. Story, Baton Rouge, La., assignor to Ethyl Corporation, New York, N.Y., a corporation of Delaware
Filed Aug. 21, 1959, Ser. No. 835,307
4 Claims. (Cl. 136—6)

This invention relates to high performance voltaic cells or batteries. In particular, it relates to new and improved voltaic cells employing printed electrodes.

Batteries, or voltaic cells, have been used for a wide variety of purposes for many years. Generally, their use is greatly limited because of their low energy output per unit weight. Much of the weight of batteries is associated with various structural requirements of the battery. Considerable weight is introduced by the weight of the electrode materials. For example, the weight of the cathodic reactants is usually a significant part of the total battery weight. These materials are usually the oxides or peroxides of metals, e.g., manganese, copper, silver, lead, mercury, vanadium, etc., and are even heavier than zinc metal which is commonly used as an anode reactant. Many of these materials are porous and also hold a small amount of electrolyte which adds to the weight. In some cells, large amounts of electrolyte are required because of the necessity to supply dilute electrode reactants. Because of the nature of the cathode reactants, it is also generally necessary that the container be made of heavy materials. Thus, elaborate mechanical supports are provided to hold relatively small amounts of active materials in close proximity.

A great need presently exists for the development of high performance, viz., high energy and high power, electrochemical sources. Such electrochemical sources should provide a large energy output per unit of packaged weight. By the "energy" requirements is meant the quantity of electrical energy that must be supplied. By the "power" requirement is meant the rate at which the energy must be delivered without regard to the total available energy. Any actual battery requires both demands, the relative importances of the two depending upon the particular use. An example of the former is a battery for the operation of a low power satellite radio transmitter for an extended period; and the latter, a battery for use as an auxiliary power source as in a missile or a rocket.

Accordingly, it is an object of the present invention to provide batteries having energetic electrochemical reactions capable of meeting high performance demands. In particular, it is an object to provide a cell utilizing extremely thin coated or "printed" electrodes. It is also an object to provide printed electrodes in combination with various electrolytes, and depolarizers, which provide adequately energetic reactions and does not require the special structures generally required in former cells. A further object is to provide a cell or battery having a low internal electrical resistance which can conveniently supply considerable power to an external circuit, especially a printed circuit, upon demand.

These and further objects will be more readily understood from the following description of some embodiments of the invention, reference being had to the accompanying drawings wherein.

This invention is characterized by the formation of a voltaic cell or battery having printed electrodes. The printed electrodes are in contact with an electrolyte, and anode and cathode are separated. In a highly preferred embodiment the anodes and cathodes are separated by a nonelectrically conducting permeable member and immersed in an electrolyte to form anode and cathode compartments. By forming an external circuit between anode and cathode, an electric current resulting from the electrochemical reaction can be withdrawn upon demand.

According to the present invention, a complete internal circuit is provided substantially wholly as electrochemically active or electrically conducting materials printed or otherwise coated upon nonconducting relatively thin permeable sheets of material. Thus, a printed sheet can be immersed in an electrolyte so that the electrochemically active or electrically conducting coating forms electrodes, including anodes and cathodes. The printing can be placed in such location on the nonconducting permeable sheets so that the sheets serve as diaphragms between anode and cathode. The individual electrodes are so disposed that each is separated from each other, particularly anode from cathode. All of the electrodes, i.e., anode and cathode, respectively, are connected to trunk lines to which the external circuit can be connected. Any electrically nonconducting material, for example, paraffin wax or certain plastics, readily serves as lightweight containers for the active and essential components of a battery.

FIGURES 1 through 4, inclusive, serve to illustrate a highly preferred and simple method for the formation of such a battery. A typical electrode system is shown in its entirety in FIGURE 1. In that figure is shown a plurality of anodes 10 printed upon one side of a sheet of paper 20. Each of the anodes 10 are connected to a trunk line 11 printed upon the same side of the sheet of paper 20. On the opposite side of the sheet of paper 20 are printed a multiple number of cathodes 12 (shown by dotted lines). Each of the cathodes is also connected to a trunk line 13 (shown by dotted lines).

Figure 1:
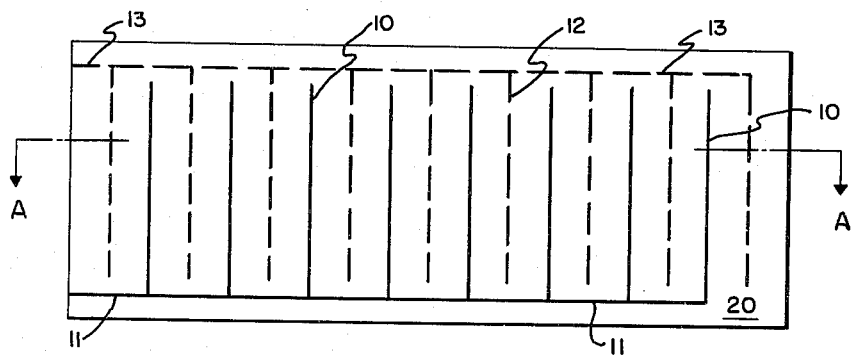
FIGURE 1 is a plan view of a multiple electrode system, including anodes and cathodes, printed or coated in some manner upon a thin sheet which also constitutes the nonconducting permeable diaphragm member.
Figure 2:
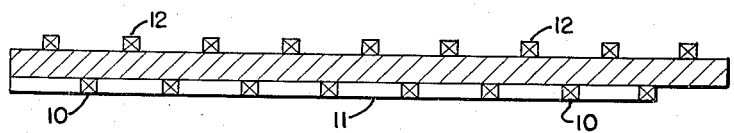
FIGURE 2 is an enlarged cross sectional view showing section AA of FIGURE 1.
Figures 3, 4:
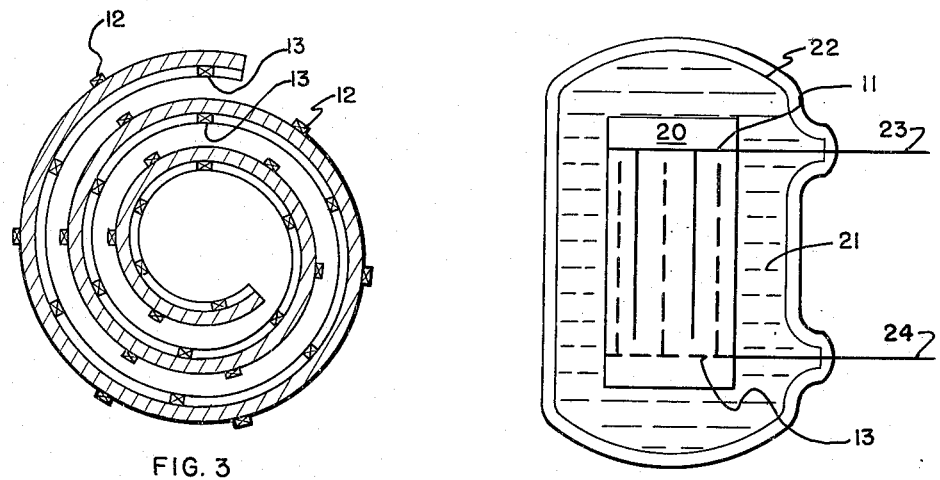
FIGURE 3 is a view showing the thin sheet, upon which the electrodes are printed, rolled in such fashion that the individual anodes and cathodes are each separate and apart from each other and such that when immersed in an electrolyte, separate anode and cathode compartments are formed.
FIGURE 4 shows a complete battery formed from the same thin sheet containing the printed electrodes.

FIGURE 2 is section AA of FIGURE 1 (magnified) which shows this embodiment of the invention in much greater perspective. FIGURE 3, also a section, illustrates the disposition of the individual anodes and cathodes as when the sheet 20 is rolled as for insertion into a container filled with the desired electrolyte. FIGURE 4 shows the electrode-diaphragm system or sheet 20 immersed in an electrolyte 21 and covered with an electrically inert material such as paraffin wax 22 so as to form a complete battery. The trunk lines 11, 13 are connected to leads 23, 24 which are passed through the container walls. An electric current can be withdrawn from the battery.

Figures 5, 6:
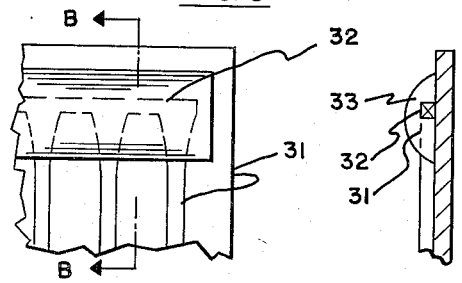
FIGURES 5 through 7 demonstrate certain refinements of the invention which are preferred embodiments.
Figure 7:
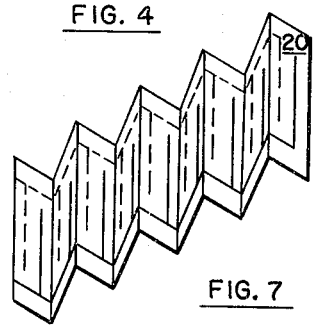

FIGURE 5 shows a small segment of a thin sheet upon which is printed electrodes 31 extended from the trunk line 32. This represents a preferred embodiment wherein the trunk line 32 and the base of the electrodes 31 are printed with a heavier coating than the terminal portions of the electrodes 31. This prevents premature breaking of the trunk lines 32 or of the base portion of the electrodes 31 so that sections of electrodes will not be isolated during the use of the cell. FIGURES 5 and 6 also show another embodiment. Thus, FIGURE 6 is section BB of FIGURE 5 wherein the trunk line 32 and the base of the electrodes 31 are covered with an electrically and chemically inert material 33 to prevent reaction at these portions during the use of the cell. FIGURE 7 shows the sheet 20 fluted rather than rolled. For some applications this is also a preferred embodiment.

The following examples illustrate the present invention but should not be construed as in any way limiting same. All parts are given in weight units unless otherwise specified.

*Example I*

A conducting ink is used to print a set of ten anodes connected to a trunk line upon one side of a sheet of porous paper, and a corresponding set of cathodes connected to a trunk line, upon the opposite side of the sheet of paper. The ink consisted of a mixture of 50 percent highly viscous graphite paste (having graphite particles of approximately 2.5 microns in diameter) and 50 percent of an inorganic filler of bentonite. A glycerol plasticizer and ethyl alcohol are also added to the mixture. The sheet of paper is then rolled in such fashion that each of the electrodes are separate and apart from each other. Next, an aqueous concentrated sodium polysulfide solution is used to wet the paper. The active material is then placed within a thin paraffin wax cartridge or half-shell container. The rolled sheet upon which is printed the electrodes is then inserted horizontally into the container. Leads from an external printed circuit are then connected to each of the trunk lines from the anodes and cathodes, respectively. The upper portion of the shell is then sealed with additional paraffin wax. An external voltage, 4 volts, is then applied to the electrodes to convert the active material into a cathode reactant and electrolyte. The battery is charged for about 2 hours. The external circuit is then completed by closure of a key within that circuit. A high current is registered within the external circuit.

In the following example, a large variety of other materials are used as depolarizers.

*Example II*

The foregoing example is repeated in all details except that in these instances the depolarizer is formed by adding particular aqueous sulfur-containing compounds to the cell. The active material used in these instances are, a saturated aqueous solution containing the reaction products of hydrogen sulfide and sulfur dioxide, sulfur mixed in an aqueous hydrogen sulfide solution, saturated aqueous sodium thiosulfate, hydrogen pentasulfide, sodium pyro-sulfate, sulfur hexafluoride, sulfuryl chloride, sulfur monobromide, pyrosulfuryl chloride and thiocyanic acid, respectively. High currents are produced in the external circuits in each instance.

Having demonstrated the use of various aqueous electrolytes in combination with certain printed electrodes the following example describes a printed battery employing an organic electrolyte.

*Example III*

In this instance metallic zinc is vapor plated in a thin film upon extremely thin tissue paper to form the anodes. The cathodes were printed upon the opposite side of the paper. The composition of the ink is 50 percent graphite, 47 percent silver chloride and 3 percent methyl methacrylate made into a paste with methyl alcohol. The organic electrolyte consisted of a mixture of acrylonitrile and propionitrile having potassium thiocyanate dissolved therein. A battery is completed as in the foregoing example. A high current is produced within an external printed circuit connected to the battery.

Although the present invention has been disclosed in connection with a few preferred embodiments thereof, a great number of variations and modifications can be made without departing from the spirit and scope of the invention. For example, many electrode materials may be employed quite successfully, vis., ordinary ceramic decorating paints made of colloidal silver, gold, and a wide variety of metals. These paints are well known in the art. Easily decomposable organometallic compounds can be used to produce the printed electrodes as in ordinary vapor phase plating operations. Vapor phase plating techniques are currently being described in the literature and patent publications. Electrically conducting inks can also be printed upon materials to form electrodes. A typical ink composition is about 25 percent gold powder, 4 percent lead metal borate, 15 percent copieba balsam, 1 percent rosin and the balance stainless steel. Such inks are well known in the art, particularly in connection with printed circuits.

The selection of materials, i.e., electrolytes, electrodes, etc. are based on known electrochemical principles. Electrolytes and dipolarizers can be of wide variety as are the electrodes which can be employed. For example, the following describes materials which can be used for formation of a lead battery:

Lead oxide, $PbO_2$, electrode; ink composition consists of 40 percent graphite, 59 percent lead oxide, $PbO_2$, 1 percent methyl methacrylate made up as a paste. After printing the ink is dried and baked.

Zinc, electrode; zinc dust in gelatin to which is added lead chloride in oil. After printing, the ink is baked and dried.

Sulfuric acid is used as the electrolyte.

Thin glass is used as the container.

The depolarizer, or electrolyte, can be sulfur or an inorganic sulfur compound capable of assuming greater than one oxidized form. Such compounds can be placed within a cell or battery at different oxidation potentials, or can be produced within a battery in situ by an impressed voltage. The sulfur compound is generally dissolved in an aqueous solution. Organic or organometallic electrolytes can also be used in combination with the appropriate electrodes. The only essential is that the electrodes used be capable of forming a potential with the electrolyte employed so that an electric current can be generated. The electrolyte solution can also be used to form "dry cells." Thus, other materials can be added to the electrolyte, for example, finely divided wood flour or other cellulose material, plastic, asbestos, etc.

The electrodes can be printed upon almost any electrically nonconducting substance, for example, silk, nylon, paper, pulpboard, or any cellulose material, glass cloth or a nonconducting plastic, etc. Generally, such diaphragm members should be between about .001 and .05 inch in thickness, though this dimension is not really critical. In folding this paper for insertion into an electrolyte or depolarizing material, it is not essential that the paper or sheet be rolled. It can be rolled, fluted or folded in any particular manner. It is only essential that the sheet be placed such that the electrodes are so disposed from one another that no short circuiting occurs. The thickness of the trunk lines upon the electrically nonconducting member and to which the electrodes are joined are preferably of a much thicker layer of ink or conducting material than the electrodes themselves. This prevents premature severance of the trunk lines prior to the time all of the electrical energy has been released from the cell. The trunk lines can also be protected by covering them with a material, for example, plastic or paraffin wax, which prevents their being attacked during the electrochemical reaction. The base of the electrodes wherein they are joined to the trunk lines can be prepared or protected in similar fashion.

Having described the invention, what is claimed is:

1. An electrochemical cell for the production of an electric current comprising an electrode unit immersed within an electrolyte, said electrode unit being a flexible electrically nonconductive sheet upon one side of which are printed a plurality of substantially parallel, laterally spaced linear anodes, and upon the other side of which are printed a plurality of substantially parallel, laterally spaced linear cathodes, said anodes and cathodes being disposed in substantially parallel, alternating lateral relationship, said anodes being connected together by a printed linear electrically conductive transverse trunk line and said cathodes being connected together by a printed linear electrically conductive transverse trunk line which is disposed in substantially parallel relationship with respect to said first-named trunk line and dispaced laterally therefrom for connection with an external circuit.

2. An electrode unit adapted for use in electrochemical cells which comprises a flexible electrically nonconductive sheet upon one side of which are printed a plurality of substantially parallel, laterally spaced linear anodes, and upon the other side of which are printed a plurality of substantially parallel, laterally spaced linear cathodes, said anodes and cathodes being disposed in substantially parallel, alternating lateral relationship, said anodes being connected together by a linear electrically conductive printed transverse trunk line and said cathodes being connected together by a linear electrically conductive printed transverse trunk line which is disposed in substantially parallel relationship with respect to said first-named trunk line and displaced laterally therefrom.

3. An electrochemical cell for the production of an electric current comprising an electrode-diaphragm unit immersed within an electrolyte, said electrode-diaphragm unit being a flexible electrically nonconductive semipermeable diaphragm sheet upon one side of which are printed a plurality of substantially parallel, laterally spaced linear anodes, and upon the other side of which are printed a plurality of substantially parallel, laterally spaced linear cathodes, said anodes and cathodes being disposed in substantially parallel, alternating lateral relationship, said anodes being connected together by a printed linear electrically conductive transverse trunk line and said cathodes being connected together by a printed linear electrically conductive transverse trunk line which is disposed in substantially parallel relationship with respect to said first-named trunk line and displaced laterally therefrom for connection with an external circuit.

4. An electrode-diaphragm unit adapted for use in electrochemical cells which comprises a flexible electrically nonconductive semipermeable diaphragm sheet upon one side of which are printed a plurality of substantially parallel, laterally spaced linear anodes, and upon the other side of which are printed a plurality of substantially parallel, laterally spaced linear cathodes, said anodes and cathodes being disposed in substantially parallel, alternating lateral relationship, said anodes being connected together by a printed linear electrically conductive transverse trunk line and said cathodes being connected together by a linear electrically conductive transverse trunk line which is disposed in substantially parallel relationship with respect to said first-named trunk line and displaced laterally therefrom.

References Cited in the file of this patent

UNITED STATES PATENTS

| 1,649,579 | Edison | Nov. 15, 1927 |
| 2,361,533 | Endress et al. | Oct. 31, 1944 |
| 2,688,649 | Bjorksten | Sept. 7, 1954 |
| 2,701,272 | Reiner | Feb. 1, 1955 |
| 2,751,427 | Woodring | June 19, 1956 |

FOREIGN PATENTS

| 7,771 | Austria | June 10, 1902 |

OTHER REFERENCES

"Printed Circuit Techniques," National Bureau of Standards Circular 468, Nov. 15, 1947.